Patented Dec. 13, 1932

1,890,668

UNITED STATES PATENT OFFICE

THEODORE F. BRADLEY, OF WESTFIELD, NEW JERSEY, ASSIGNOR TO AMERICAN CYANAMID COMPANY, OF NEW YORK, N. Y., A CORPORATION OF MAINE

POLYHYDRIC ALCOHOL-POLYBASIC ACID RESIN

No Drawing.    Application filed December 16, 1929. Serial No. 414,587.

This invention relates to polybasic acid—polyhydric alcohol resinous materials and more particularly relates to those materials which are soluble in the common organic solvents such as are used for the manufacture of lacquers and the like.

A large number of resinous esters have been prepared and described for use in coating compositions and the like. The group of synthetic resins falling within the class known as the polyhydric alcohol—polybasic acid type, have been generally considered as equivalents for use in lacquers or other coating compositions. However, I have found that such is not the case and, while some of these resinous materials are useful with such substances as nitro-cellulose and the like, in many cases the use of certain of these resinous materials actually decreases the durability and toughness normal to nitro-cellulose. Furthermore, many of these resinous esters are insoluble in the common organic solvents and particularly the cheaper hydrocarbon solvents such as toluene.

It is one of the objects of the present invention to produce synthetic resinous esters of the polybasic acid—polyhydric alcohol type which are freely soluble in the usual pyroxylin lacquer solvents and diluents. It is a further object to prepare resinous esters which are freely miscible or compatible with nitro-cellulose in all proportions and which are capable of protecting and preserving the nitro-cellulose from the destructive influences of sunlight and other "weathering" agencies. It is a further object of this invention to prepare resinous esters which improve the adhesion, gloss and general appearance of pyroxylin films and plastics containing the same.

These and other objects are attained by combining simple dihydric alcohols or glycols containing more than two carbon atoms, with polybasic acids. These simple glycols have the generic formula $R(OH)_2$ where R is a straight chain hydrocarbon radicle having more than 2 carbon atoms and hence this group does not include the ether alcohols such as diethylene glycol and the like.

The following examples are given merely for purposes of illustration and not in limitation:

*Example 1*

| | Parts by weight |
|---|---|
| Propylene glycol (1–2 propane diol) | 76 |
| Phthalic anhydride | 148 |

This mixture, representing one mol. each of the glycol and phthalic anhydride, was heated together in a partially closed vessel to a maximum temperature of 290° C., over a period of approximately 2½ hours. The final product was a soft, pale, straw-colored resin having an acid number of 56.3. This product was freely soluble in n-butyl and amyl acetates, and in n-butyl propionate. This resinous material is not substantially soluble in toluene alone, but solutions of the resins in the previous solvents may be diluted with toluene. Accordingly this resin may be used to advantage in compositions containing the usual solvent mixtures in which a large proportion of hydrocarbon diluent is used. This resinous material is particularly valuable in view of its compatibility with nitro-cellulose.

*Example 2*

| | Parts by weight |
|---|---|
| Trimethylene glycol (1–3 propane diol) | 76 |
| Phthalic anhydride | 148 |

This mixture of equivalent combining proportions was heated as in Example 1, yielding a product having substantially the same characteristics as that obtained in Example 1. This material likewise is compatible with nitro-cellulose and is suitable for use in lacquer compositions.

*Example 3*

| | Parts by weight |
|---|---|
| 2–3 butylene glycol | 100 |
| Phthalic anhydride | 148 |

This mixture was reacted as described in Example 1 and yielded a product of a softer nature than those prepared in accordance with Examples 1 and 2. The resinous material so prepared was found to be soluble in toluene as well as in such solvents as butyl acetate and the like. It displays excellent compatibility with nitro-cellulose.

Resinous materials prepared using ethylene glycol or diethylene glycol in equivalent amounts in the above examples were found to be soluble in ethyl acetate but were insoluble in n-butyl acetate and in toluene and because of this property are unsuitable for general use in nitro-cellulose compositions or other compositions containing the usual solvent mixtures.

In general, according to my invention, I have found that the use of glycols whose molecule contains three or more carbon atoms, enables me to produce resinous esters which, unlike the glycerol and related polyhydric alcohol resins, are not capable of transformation by heat to infusible and insoluble bodies. Moreover, I have found that the resins which I prepare from the preferred glycols are found to dissolve in butyl acetate and in other common lacquer solvents and, while all of the resins are not soluble in toluene and similar cheap hydrocarbons, those which are not so soluble may be dissolved in the other solvents and such solutions may then be diluted with toluene or the like without causing any precipitation of the resinous material. It is apparent, therefore, that this behavior with respect to solvents clearly indicates fundamental differences exhibited by my resins as compared to the previously known products of allied chemical constitution. It is easily seen that the resinous products obtained by reaction of the various polyhydric alcohols, and particularly the glycols, with polybasic acids, are not complete equivalents.

The foregoing examples show clearly that as ethylene glycol is replaced by its higher homologues in the resinification reaction, I am able to obtain products which progressively become softer and which improve in solubility. Thus I may use propylene glycols, butylene glycols, amylene and similar simple glycols, as distinguished from the complex glycols such as diethylene glycol and the like. While I prefer to combine the glycol with phthalic acid or its anhydride, similar products are obtained by replacing the phthalic acid with other polybasic carboxylic acids, or their anhydrides, such as succinic, malic, maleic, citric, tartaric, etc. If desired I may use mixtures of the glycols, or acids, or both in any suitable combination.

In some cases I may prepare more complex resins by adding to the reaction mixture one or more of the fatty or vegetable oils, including linseed, tung, soya bean, cottonseed, cocoanut and castor oils and/or their fatty acids. Likewise I may introduce rosin, congo or other natural resin acids to form a constituent portion of the resinous esters.

The following are specific examples of compositions suitable for lacquers or the like which may be prepared from my resinous materials.

*Example 4*

| | Parts by weight |
|---|---|
| Resinous ester #3 | 2 |
| Low viscosity nitrocellulose | 1 |
| n-butyl acetate | 4 |
| Toluene | 4 |

*Example 5*

| | Parts by weight |
|---|---|
| Resinous ester #1 | 4 |
| Low viscosity nitrocellulose | 1 |
| n-butyl acetate | 30 |
| n-butyl alcohol | 10 |
| Toluene | 20 |

In the preparation of these and various other lacquer compositions, it was found that the resinous esters were completely soluble in the solvent mixtures used and the resins were completely miscible with the nitro-cellulose. Application of these lacquers to various surfaces, including both wood and metal, and an exposure of the lacquered surfaces to the weather in comparison with suitable control lacquers containing no resin or the other known synthetic or natural resins, showed that the resinous esters of my invention increased considerably the durability of the nitro-cellulose as compared with the control lacquers. Gloss, adhesion and other qualities of the coatings containing my resinous esters were excellent.

The products of this invention may be mixed, if desired, with the usual pigments, plasticizers and known lacquer resins for the production of lacquers or coating materials including paints, enamels, varnishes and the like. In addition, my resinous esters may be employed in the production of plastics such as celluloid or the like. Furthermore, I may combine my products with the phenol-aldehyde type condensation products to further modify and harden the same.

While polybasic acid—polyhydric alcohol resins, in the past, have been rendered soluble in toluene, butyl acetate and the like solvents through combination with mono-basic acids and acid resins, the present invention points out how such solubility may be obtained without such alteration in chemical constitution. Thus, I have described the production of higher glycol—polybasic acid resins which are soluble in toluene, butyl acetate and the usual solvents without necessitating the employment of other acids in preparing the resins.

It will be apparent that many modifications may be made in carrying out the invention, which is not limited to the details set forth except as noted in the appended claims.

I claim:—

1. A synthetic resinous ester comprising the reaction product of a polybasic acid and a simple dihydric alcohol, devoid of monobasic acid, said resin being soluble in toluene.

2. A synthetic resinous ester comprising the reaction product of a polybasic acid and a simple dihydric alcohol, devoid of monobasic acid, said resin being soluble in a lacquer solvent mixture containing a substantial proportion of toluene.

3. A synthetic resinous ester comprising the reaction product of phthalic anhydride and a simple dihydric alcohol, devoid of monobasic acid, said resin being soluble in toluene.

4. A synthetic resinous ester comprising the reaction product of phthalic anhydride and a simple dihydric alcohol, devoid of monobasic acid, and resin being soluble in a lacquer solvent mixture containing a substantial proportion of toluene.

In testimony whereof, I have hereunto subscribed my name this 13th day of December 1929.

THEODORE F. BRADLEY.